Oct. 28, 1969 J. A. HOLLY 3,474,491
MOLDING APPARATUS WITH STACKER MEANS
Filed June 30, 1967 4 Sheets-Sheet 1

INVENTOR.
JAMES A. HOLLY
BY *Hofgren, Wegner, Allen,*
*Stellman & McCord.*
ATTORNEYS.

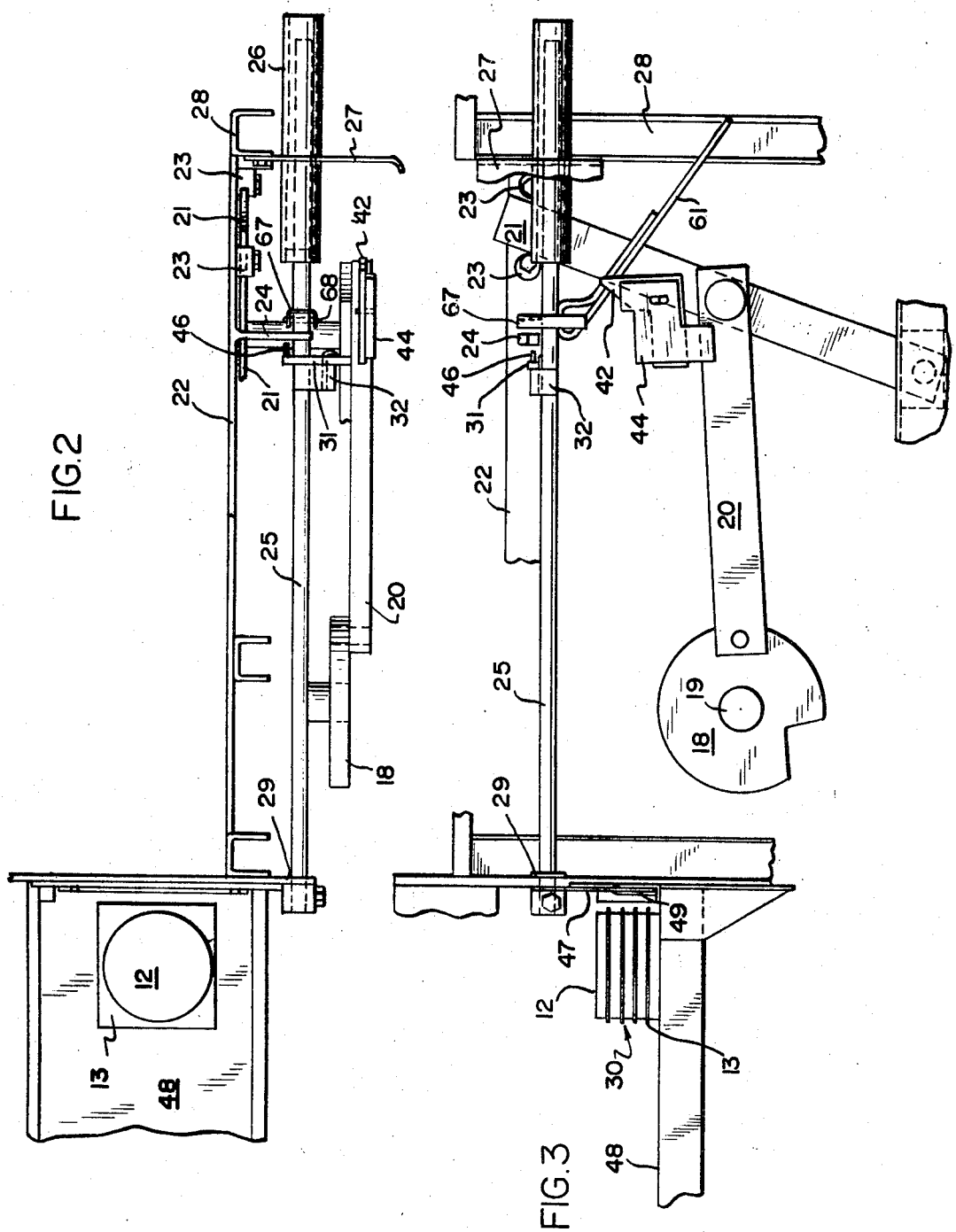

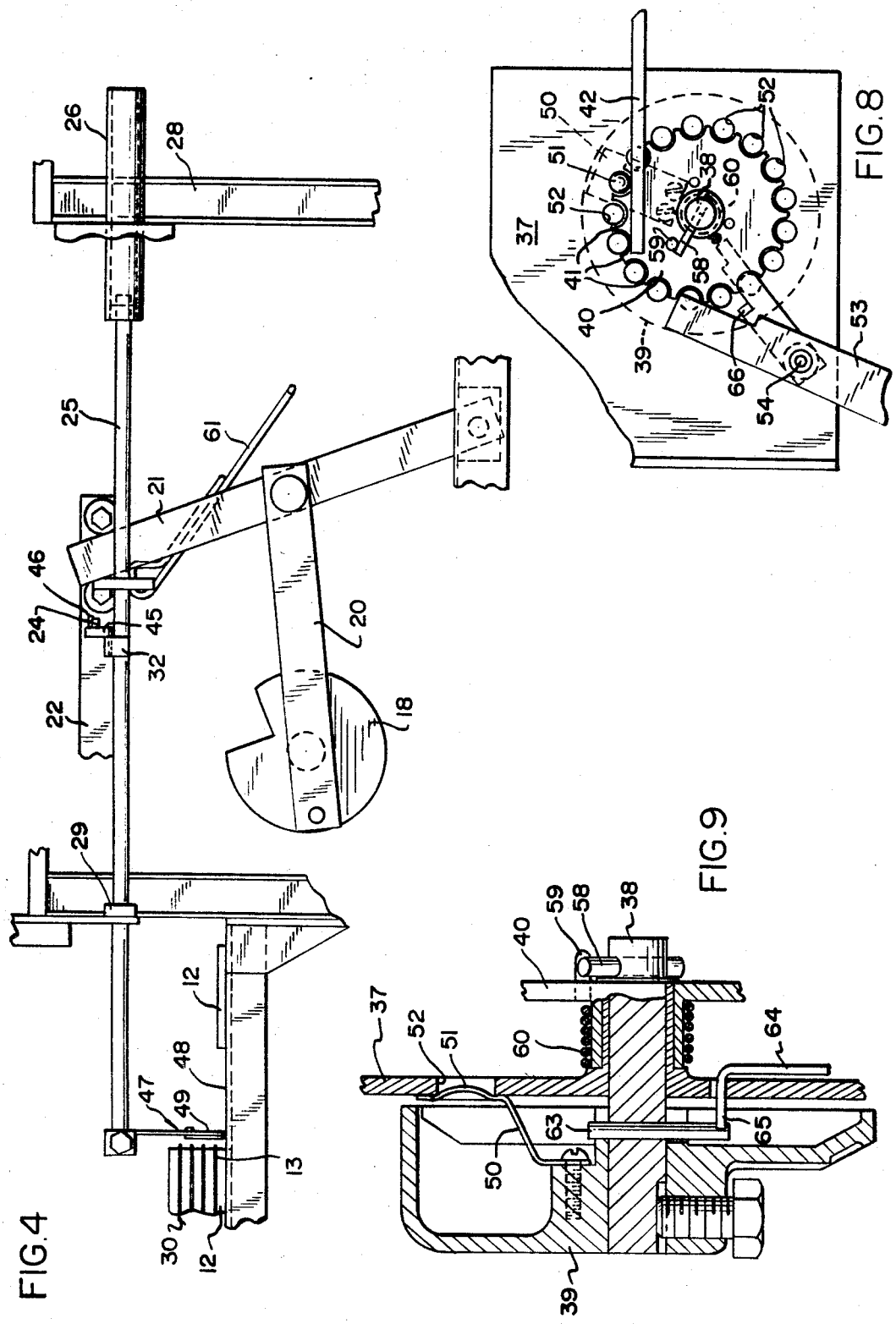

Oct. 28, 1969   J. A. HOLLY   3,474,491
MOLDING APPARATUS WITH STACKER MEANS
Filed June 30, 1967   4 Sheets-Sheet 4

' # United States Patent Office 3,474,491
Patented Oct. 28, 1969

3,474,491
MOLDING APPARATUS WITH STACKER MEANS
James A. Holly, Olympia Fields, Ill., assignor to Hollymatic Corporation, a corporation of Delaware
Filed June 30, 1967, Ser. No. 650,318
Int. Cl. A22c 7/00
U.S. Cl. 17—32
21 Claims

ABSTRACT OF THE DISCLOSURE

An apparatus for molding a series of articles such as edible patties of meat, fish and the like and arranging them in groups, particularly stacks, each containing a preselected number of the articles with the apparatus including movable pusher means adapted to be interconnected with and operated by the mold that molds the articles in order to move the successive groups of articles on a support and make room for the next group.

CROSS REFERENCES

There are a number of patents assigned to the assignee of the present application disclosing molding apparatus for providing a series of molded articles and particularly edible patties. These also disclose various ways of applying a separator sheet to each article in order that the articles, particularly when stacked, will not stick together. Because the particular separator applying apparatus is not a factor in the present invention it is not illustrated herein. One recent prior patent that discloses a separator sheet applying device is Harry H. Holly Patent 3,293,688, issued Dec. 27, 1966.

Fetzer Patent 3,222,935 discloses a counting device for controlling the number of articles in a group such as the number of patties in a stack and the counter disclosed herein is somewhat similar thereto.

The above patents are assigned to the same assignee as the present application.

In general, the apparatus of this invention comprises a hopper for providing a supply of moldable material such as ground meat from which the articles such as individual patties are molded, a mold movable in a path having an article shaping opening for receiving material from the supply at one position in the path and from which the shaped article such as the patty is removed at a second position in the path, mold apparatus for operating the mold in successive cycles for a series of movements for providing successive groups of the articles or patties, a movable pusher device for pushing each group after it is formed, and apparatus for operatively interconnecting the pusher device and mold apparatus to move the pusher by operation of the mold apparatus a distance sufficient to move each group to make room for the next group.

One embodiment of the invention is illustrated in the accompanying drawings of which:

FIGURE 2 is a partial plan view of that portion only of the apparatus directly related to the pusher device.

FIGURE 3 is a view similar to FIGURE 2 but showing that portion of the apparatus in side elevation.

FIGURE 4 is a view similar to FIGURE 3 but showing parts of the apparatus in forward position as contrasted to the retracted position of FIGURE 3.

Figure 5:
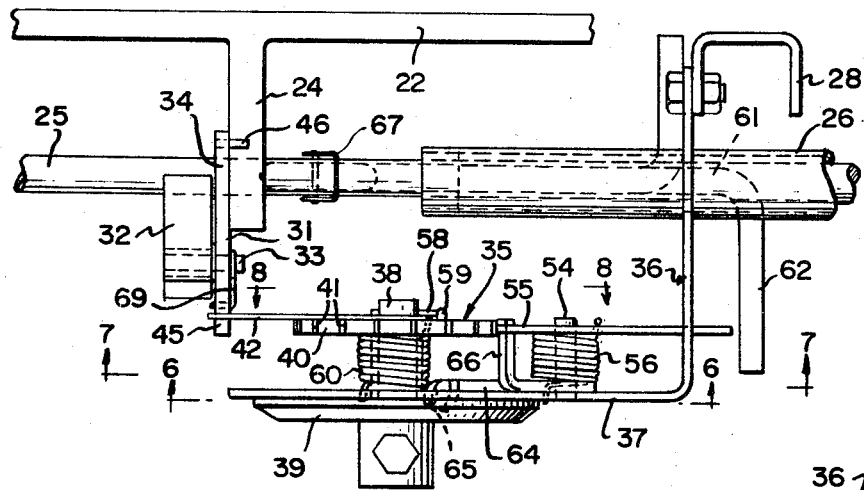
FIGURE 5 is an enlarged fragmentary plan view of the adjustable "counter" portion and associated parts of the apparatus.
Figure 7:
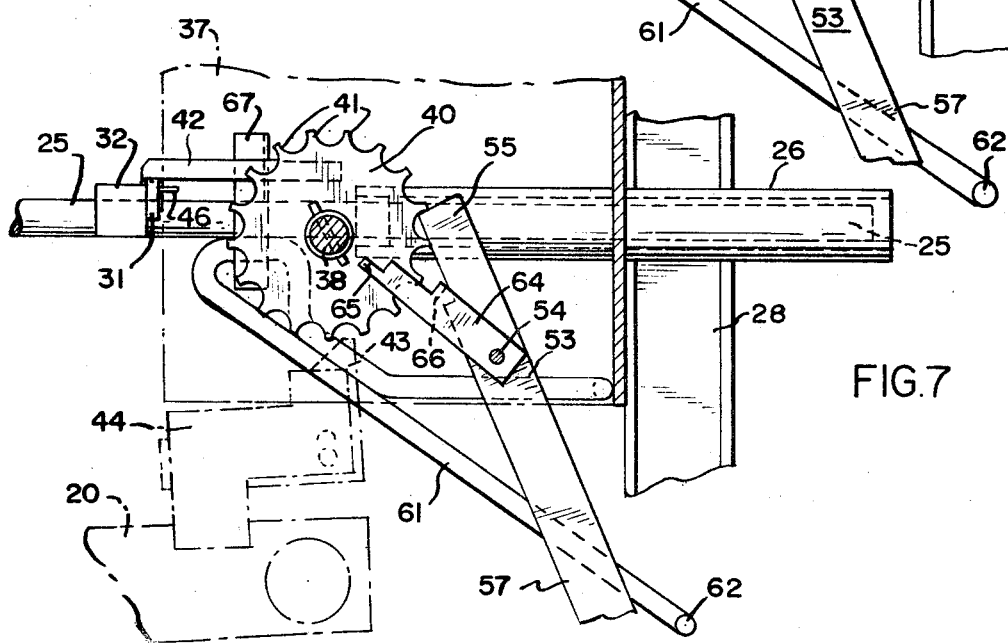

FIGURE 7 is a fragmentary sectional view taken substantially along line 7—7 of FIGURE 5 but omitting certain parts for clarity of illustration and showing the front supporting bracket 37 and the adjacent portions 20 and 44 of the drive mechanism in phantom lines.

FIGURE 8 is a fragmentary elevational view taken substantially along line 8—8 of FIGURE 5.

FIGURE 9 is an enlarged sectional view of the portions of the apparatus of FIGURE 8.

Figure 1:
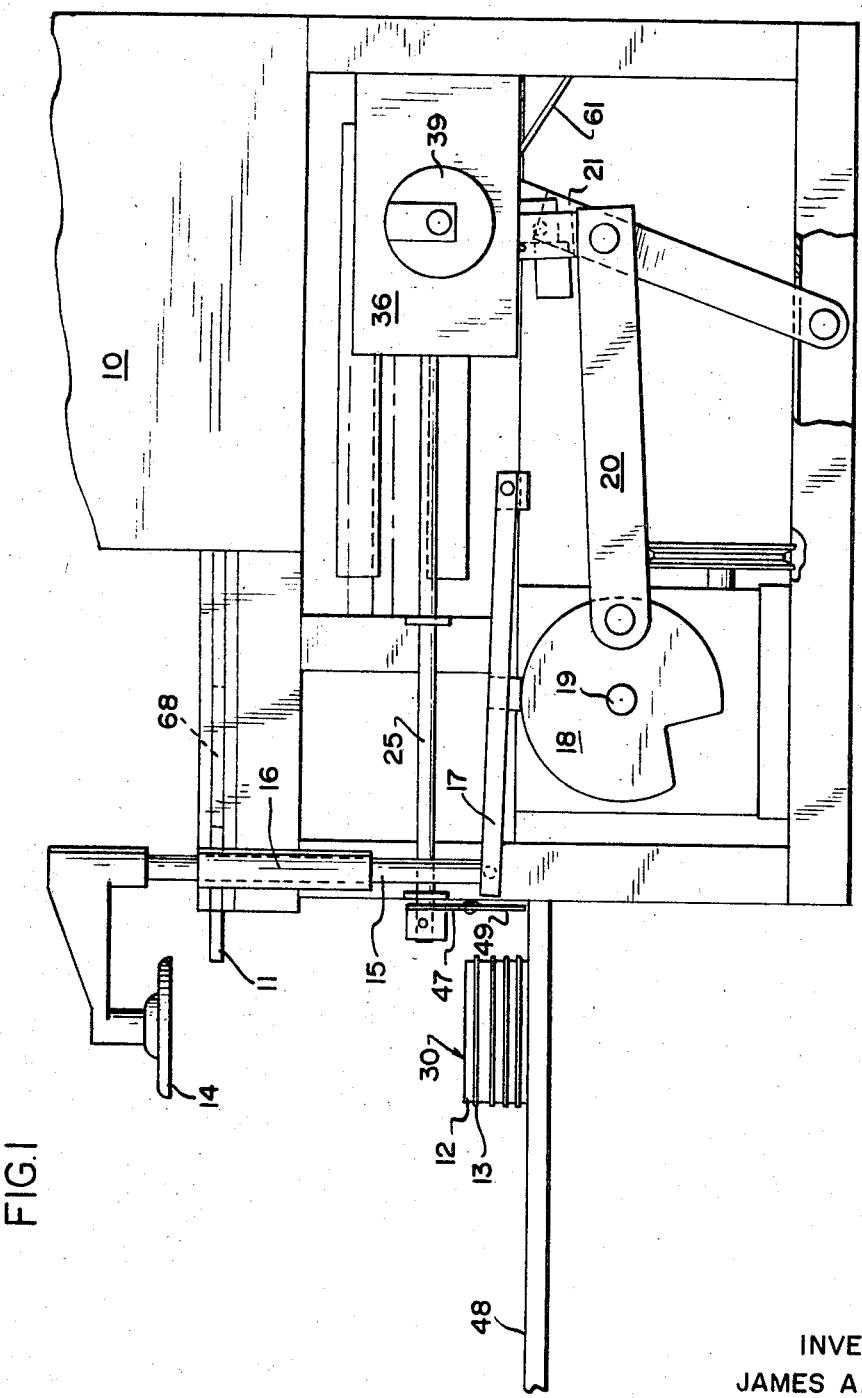
FIGURE 1 is a side elevational view of an apparatus embodying the invention but with portions such as a separator paper feed omitted for simplicity.

As shown in FIGURE 1 the molding apparatus portion of this invention is generally similar in construction and operation to the one shown and described in the above Holly Patent 3,293,688, that is, the apparatus itself comprises supply means including a hopper 10 for holding a supply moldable material such as ground meat, mold apparatus including a reciprocable mold plate 11 having a circular opening 68 therein for receiving meat from the hopper 10 and forming a patty 12 at one position (the position shown in FIGURE 1) and from which the patty is removed at a second position which is under the knockout ring 14. A separator paper sheet 13 is applied to each patty 12. The circular knockout ring 14 is mounted on a vertical rod 15 movable in a cylindrical guide 16 by a hinged lever 17 that is moved in proper timing in a vertical path by a cam 18 rotated by a gear reducer shaft 19. This cam 18 also drives one link 20 of a linkage system which includes a second link 21 with this second link driving the mold apparatus of which the mold plate 11 is a part. This mold apparatus 22 is driven by having the upper end of the second link 21 arranged between two abutments 23 on the side of the mold apparatus 22 as shown most clearly in FIGURE 3.

Extending laterally from the mold apparatus 22 is a driver 24 here shown as a horizontal arm. This driver 24 is movable in a path which in this embodiment is a horizontal path and arranged adjacent thereto is a horizontal longitudinally movable pusher bar 25 that is guided in its horizontal movement by a guide sleeve 26 attached to a rear part 27 on the frame 28 of the molding apparatus. The forward end of the reciprocable pusher bar 25 is guided by another portion 29 of the frame of the apparatus.

In this construction the driver arm 24 is reciprocated in a horizontal path upon movement of the mold apparatus 22 while the stack 30 of patties 12 is being produced. The pusher bar 25 is stationary until the stack 30 is complete after which the driver arm 24 on the mold apparatus 22 and the pusher bar 25 are interconnected to push the stack 30 of patties forward from the position shown in FIGURE 3 to the position shown in FIGURE 4 to make room for the next patty 12 in the next stack. The manner in which the mold apparatus 22 and the pusher bar 25 are periodically interconnected to produce this result will now be described.

To provide this interconnection a catch in the form of a hinged latch 31 shown in enlarged plan view in FIGURE 5 is mounted on a block 32 on bar 25 for movement about a hinge pin 33. As shown in FIGURE 5 the latch 31 is positioned between the block 32 and the driver arm 24 and is held beneath the horizontal path of travel of the outer end of arm 24 by a spring 69.

In order to raise the end 34 of latch 31 into position to be engaged by the driver 24 a preset adjustable counter device 35 that is shown in detail in FIGURES 5–9 is used. This counter device is somewhat similar to that shown and described in the above Fetzer patent. The device 35 is mounted on a bracket 36 that is located at the rear front of the molding apparatus as shown in FIGURE 1. The forward vertical plate 37 of the bracket has extending therethrough a rotatable horizontal shaft 38 with the forward end in front of the plate 37 having mounted thereon a knob 39 by means of which the number of patties in a stack may be preselected. The inner end of this shaft 38 carries a sprocket 40 having a series of circularly arranged spaced sprocket teeth 41.

Figure 6:
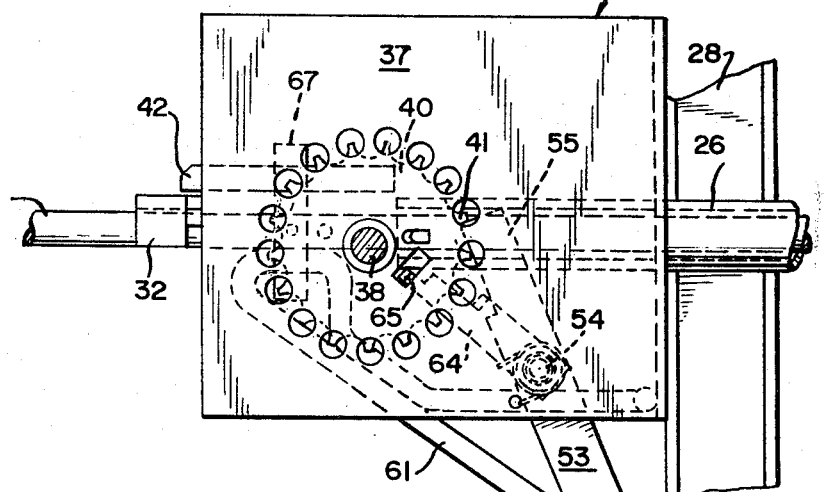
FIGURE 6 is a sectional elevational view taken substantially along line 6—6 of FIGURE 5.

The sprocket 40 on its inner surface carries a projecting arm 42 that is movable with the sprocket. This sprocket is turned in increments equal to the spacing of adjacent teeth 41 by means of a hinged and vertically movable catch member or dog 43 movably mounted on a bracket 44 which itself is mounted on the drive link 20 that is a part of the drive for the mold apparatus 22. Each time the dog is moved from front to back, or from left to right as shown in FIGURES 3 and 7, it engages a tooth 41 on the sprocket 40 and turns the sprocket one increment in a counterclockwise direction as shown in FIGURES 6 and 7. After a preset number of increments which is equivalent to the desired number of patties 12 in a stack 30, the arm 42 will have been moved to the position shown in the drawings where it contacts the end 45 of the latch 31 to raise the opposite end 34 about the hinge 33 into the path of travel of the driver arm 24 where it is contacted by this arm as shown in FIGURES 4 and 5.

The latch 31 is held in this engagement with the arm 24 by a rearwardly extending pin 46 on the latch 31 bearing down on the top surface of the driver arm 24 by the urging of spring 69. When in this engagement the pusher bar 25 is moved forwardly or from the position shown in FIGURES 2 and 3 to the position shown in FIGURE 4. When this occurs a patty contacting pusher plate 47 on the forward end of the pusher bar 25 engages the stack of patties 30 on a supporting platform 48 and pushes it forwardly.

The pusher plate 47 is in two parts with the lower part 49 being hingedly connected to the remainder of the plate 47 for movement to the left but not the right in FIGURE 4 so that the lower part 49 can be dragged back over the first patty 12 in the next stack.

Once the stack of patties has been moved forward as shown in FIGURE 4 the rearward movement of the mold apparatus 22 pulls the driver arm 24 from beneath the holding pin 46 so that the spring 69 returns the latch 31 down against the pusher bar 25 where it is again beneath the path of movement of the driver arm 24. The rearward movement of the mold apparatus causes arm 24 to engage catch 67 on bar 25 and return it to retracted position.

As stated earlier, the counter device 35 operates on each molding movement of the apparatus 22 to determine the number of patties deposited in the stack 30. This number can be regulated by rotating the shaft 38 by means of the knob 39. The manner in which this is accomplished is as follows:

As shown in FIGURES 8 and 9 the knob 39 carries with it a spring plate 50 having on its outer end a rounded area 51 that is adapted to engage one of a series of holes 52 in the bracket plate 37 to hold the knob in any given position within the range of arcuate movement of the knob. This position determines the number of patties in each stack. On each production of a patty 12 of the series of patties that make up the predetermined stack 30 the sprocket 40 is turned one increment (the space between adjacent teeth 41) by engagement of the dog 43 with a sprocket tooth 41 as described. The sprocket and thus the arm 42 are held in the position to which they have been moved until the next increment by means of a retaining member 53 here shown as a hinged lever mounted on a hinge pin 54 on bracket plate 37 (FIGURE 5). The upper end 55 of this lever 53 is urged toward the sprocket 40 by means of a helical spring 56 positioned around the pin 54. The lower end 57 of this lever 53 extends down beneath the bracket plate 37.

When the number of patties in a stack has been preset by moving the knob 39, which may contain a series of numbers to indicate the number of patties in a stack, the movement of the knob 39 rotates the shaft 38 to a corresponding position and this shaft 38 carries with it a stop pin 59 shown most clearly in FIGURES 8 and 9. Adapted to contact this stop pin 58 at the beginning of a "stack count" is a second stop pin 59 on the sprocket 40. The pin 59 is urged toward the pin 58 by spring 60.

As stated above, the retaining member lever 53 retains the sprocket 40 against counterrevolution by spring 60 between increments of movement. Once the pusher bar 25 has been interconnected to the mold apparatus 22 by means of driver arm 24 and latch 31, as described, and the pusher bar 25 has been moved forwardly it carries with it a release arm 61 that has a hook 62 on its lower end. This hook engages the lower end 57 of the lever 53 and rotates it in a clockwise direction as viewed in FIGURES 6 and 7 to release the engaged tooth 41 of the sprocket 40 so that the sprocket spring 60 can rotate the sprocket in a clockwise direction as shown in FIGURES 6 and 7 (counterclockwise in FIGURE 8) to where the stop pin 59 on the sprocket 40 is stopped by the pin 58 on the shaft 38. When this occurs, the counter device 35 has been reset for counting another stack of patties.

Where the counter is to be deactivated there is provided on the shaft 38 and concealed by the knob 39 a deactivating pin 63. This pin, as shown in FIGURE 9, extends beyond the shaft 38 and when moved to an "off" position as shown in FIGURE 9 by the knob 39 engages the extending end 65 of a deactivating lever 64. This lever 64 is rotatably mounted about the retaining lever hinge pin 54 and has the end 65 extending forwardly through an opening in the bracket plate 37 and an intermediate part 66 (FIGURE 5) extending rearwardly to in front of the upper end of the retaining member 53. Thus when the knob 39 is turned to the off position where the deactivating pin 63 engages the forward end 65 of the lever 64 further movement in this direction of the knob 39 causes the intermediate part 66 of the lever 64 to move and hold the upper end 55 of the retaining member lever 53 to the right as viewed in FIGURE 7 so that it is out of position to be engaged by a tooth 41. In this arrangement the molding apparatus 22 continues to operate without being affected by the counter device 35.

The deactivating pin 63 and lever 64 also function as a safety device so that in the event of malfunction the apparatus will not continue to operate the counter over and over. When such malfunction does occur, the sprocket 40 instead of being moved to the beginning of its path of movement and then counting a new stack as occurs in normal operation and then repeating over and over will continue to move until it contacts the stop pin 58. When this occurs further movement of the sprocket 40 will cause the pin 59 to move pin 58 and thus shaft 38, knob 39 and deactivating pin 63 which move the stop member lever 53 to inactive or "off" position as described above. This "off" position will indicate to the operator that there is a malfunction even if nothing else does. Furthermore, even if the mold apparatus should continue to operate the counter device 35 will not operate.

The operation of the illustrated apparatus is as follows. The number of patties desired in a stack is preset by turning the knob 39 to a position corresponding to the number of patties and this number of patties will be determined by the distance the sprocket arm 42 is moved from the latch 31. In the figures of the drawings this arm 42 is in contact with the latch because the number of patties 12 in a stack 30 has already been produced.

The knob 39 is held in this desired position indicative of the thusly preset number of patties in a stack by engagement of the spring arm 50 (FIGURE 9) with the corresponding hole 52 in the bracket plate 37. The turning of the knob 39 turns the shaft 38 and thus the stop pin 58 to a position corresponding to the number of patties desired. At the beginning of the counting the sprocket stop pin 59 will be urged in contact with the shaft stop pin 58 by the sprocket spring 60.

On each reciprocation of the mold apparatus 22 by the rotation of the cam 18 and the reciprocation of the driving links 20 and 21 a patty 12 is produced and drops onto the support platform 48 where a series of patties will be arranged in a stack 30.

Each time the apparatus 22 makes a round trip, which of course is the path covered when the mold plate 11 moves from its extreme right-hand position to its extreme left-hand position and back again as shown in FIGURE 1, the dog 43 on the drive link 20 engages a tooth 41 and turns the sprocket 40 one increment which is the distance between adjacent teeth 41. This turning of the sprocket one increment moves the sprocket arm 42 one increment toward the latch 31. The sprocket 40 is held in this position by the spring urged retaining lever 53.

After the sprocket 40 has been turned for the complete movement necessary to provide the desired number of patties in the stack the sprocket arm 42 will then have been moved into contact with the latch 31 and will raise the latch 31 until the end 34 of this arm is in the path of movement of the driver arm 24 and the latch pin 46 is above this driver arm. The next forward movement of the mold apparatus 22 will then cause the driver arm 24 to move the pusher arm 25 forwardly or from the position shown in FIGURES 2 and 3 to the position shown in FIGURE 4. When this occurs the pusher plate 47 on the forward end of the bar 25 will push the stack 30 of patties forward to make room for the next stack 30. Then on rearward movement of the mold apparatus 22 the hinged part 49 on pusher plate 47 will yield to slide back over the top of the patty 12 to the right thereof (FIGURE 4) which was deposited by this forward movement of mold apparatus 22 and which is the first patty of the next stack.

On this rearward movement the driver arm 24 engages a hinged catch 67 on the pusher arm 25 spaced rearwardly of the latch 31. As shown in FIGURES 2–5, the catch 67 is always at the rear of the driver arm 24. Then, further rearward movement of the mold apparatus 22 causes the driver arm 24 to return the pusher bar 25 to its retracted position of FIGURES 2 and 3. The hinged catch 67 is hingedly mounted on a cross pin 68 and has a weighted bottom so that it is free to turn in a counterclockwise direction but is held against turning in a clockwise direction as viewed in FIGURE 3. This forward pivoting is permitted in order to prevent damage to the apparatus in the event of a malfunction.

The forward pusher movement of the pusher bar 25 as described is also used to release the retaining lever 53 from a sprocket tooth 41. This is accomplished by providing the release arm 61 attached to and movable with the pusher bar 25. Upon forward movement of arm 61 with bar 25 the hook end 62 of the release arm 61 engages the lower end 57 of the retaining lever 53 to turn it in a clockwise direction as viewed in FIGURE 6 to release the tooth 41 with which the upper end 55 may be in engagement. This release causes the spring 60 to immediately return the sprocket to its initial position where the stop pins 58 and 59 are in engagement.

As can be seen from the above description the apparatus of this invention provides a simple device for arranging a series of molded articles in successive groups, such as a series of edible patties in stacks. The molding apparatus provides the group of molded articles and a movable pusher means is provided for pushing the group or stack forward on a support to make room for the first article of a next group or stack. The illustrated molding apparatus includes a linearly movable flat mold plate with a mold opening therein corresponding to the circular shape of the illustrated patty 12 and the pusher means includes the elongated linearly movable pusher bar 25 adjacent the mold plate apparatus 22 having a patty contacting pusher plate thereon in two parts, one of which 49 is movable in order to pass over the first molded article such as the patty 12 in the next stack 30.

Having described my invention as related to the embodiment shown in the accompanying drawings, it is my intention that the invention be not limited by any of the details of description, unless otherwise specified.

I claim:

1. Molding apparatus for providing a series of groups of molded articles with each group containing a preselected number of said articles, comprising: supply means for providing a supply of moldable material from which said articles are molded; mold means, movable in a path, having an article shaped opening for receiving material from said supply means at a first position in said path and from which the shaped article is removed at a second position in said path; means for operating said mold means for a series of movements between said first and second positions for providing a group of said articles; movable pusher means for pushing said group; and apparatus for operatively interconnecting said pusher means and mold means during the first said movement of the next said series to move said pusher means by said mold means a distance sufficient to move said group laterally aside in the direction of movement of the mold means from said first to said second position to make room for the first article in the next said group, movement of the thusly interconnected mold means and pusher means from said first to said second positions in said next series constituting a group pushing movement and from said second position to said first position constituting a return movement of the pusher means.

2. Molding apparatus for providing a series of groups of molded articles with each group containing a preselected number of said articles, comprising: supply means for providing a supply of moldable material from which said articles are molded; mold means, movable in a path, having an article shaping opening for receiving material from said supply means at one position in said path and from which the shaped article is removed at a second position in said path; means for operating said mold means for a series of movements for providing a group of said articles; movable pusher means for pushing said group; and apparatus for operatively interconnecting said pusher means and mold means during the first said movement of the next said series to move said pusher means by said mold means a distance sufficient to move said group to make room for the first article in the next said group, movement of the thusly interconnected mold means and pusher means from said first to said second positions in said next series constituting a group pushing movement and from said second position to said first position constituting a return movement of the pusher means, said mold means comprising a linearly movable flat mold plate having said mold opening therein in the shape of a patty and said pusher means comprises an elongate, linearly movable pusher bar adjacent said mold plate having a patty contacting pusher plate thereon.

3. Molding apparatus for providing a series of groups of molded articles with each group containing a preselected number of said articles, comprising: supply means for providing a supply of moldable material from which said articles are molded; mold means, movable in a path, having an article shaping opening for receiving material from said supply means at a first position in said path and from which the shaped article is removed at a second position in said path; means for operating said mold means for a series of movements between said first and second positions for providing a group of said articles; support means for receiving said group of articles in a stack during said series; movable pusher means for pushing said group; and apparatus for operatively interconnecting said pusher means and mold means during the first said movement of the next said series to move said pusher means by said mold means a distance sufficient to move said group laterally aside in the direction of movement of the mold means from said first to said second position to make room for the first article in the next said group, movement of the thusly interconnected mold means and pusher means from said first to said second positions in said next series constituting a group pushing movement and from said second position to said first position constituting a return movement of the pusher means, movement of said mold means from said one position to said second position and return to said one position comprising a cycle of mold movement.

4. The apparatus of claim 3 wherein said pusher plate has two parts interconnected with one part aligned with the bottom article in said stack and movable relative to the other part on passing over the first molded article in the next series on said support means during said return movement.

5. The apparatus of claim 3 wherein means are provided for operatively disconnecting said mold means and pusher means on said return movement.

6. The apparatus of claim 3 wherein said apparatus for operatively interconnecting said mold means and pusher means comprises driver means movable with said mold means, catch means on said pusher means, and means for arranging said driver means and catch means in operating engagement during said pushing movement.

7. The apparatus of claim 6 wherein said catch means comprises a movable latch normally out of engagement with said driver means, and there are provided means for moving said latch into said engagement with said driver means after said preselected number of said cycles.

8. The apparatus of claim 7 wherein said driver means moves with said mold means in a path and said latch is adjacent to but out of said driver means path until said moving of said latch.

9. The apparatus of claim 3 wherein said apparatus for operatively interconnecting said mold means and pusher means comprises driver means on said mold means movable in a path, catch means comprising a movable latch on said pusher means adjacent to but out of said path, and means for moving said latch into said path for engagement with said driver means for movement of said pusher means with the mold means during the stack pushing movement of the next said cycle.

10. The apparatus of claim 9 wherein there are provided means for moving said latch out of said path during said return movement of said next cycle.

11. The apparatus of claim 10 wherein there are provided interengaging means on said driver means and pusher means for moving said pusher means in said return movement.

12. The apparatus of claim 9 wherein said means for moving said latch comprises a movable operating member operatively engageable with said latch for said movement thereof, means for moving said operating member in a plurality of successive increments into said operative engagement, each said increment being equivalent to one said cycle of movement of said mold means, and means for varying the number of said plurality of increments.

13. The apparatus of claim 9 wherein said means for moving said latch comprises a movable operating member having a latch engaging member thereon, means for moving said operating member to a selected initial position where said latch engaging member is out of operating engagement with said latch, and means for moving said operating member from said initial position in successive increments, each of which is equivalent to one said cycle of movement of said mold means, until said latch engaging member is in latch moving engagement with said latch.

14. The apparatus of claim 13 wherein said means for moving said operating member comprises a catch member on said means for operating said mold means.

15. The apparatus of claim 13 wherein there are provided a stop member operatively engaged by said operating member when in said initial position, urging means urging said operating member toward said stop member, and means for varying the location of said stop member.

16. The apparatus of claim 15 wherein there are provided a retaining member for retaining said operating member against movement after each said increment, and means for releasing said retaining member subsequent to the last of said increments for return of said operating member to said engagement of said stop member under the urging of said urging means.

17. The apparatus of claim 15 where said means for varying the location of said stop member operatively carries a deactivating member engageable with said catch member for holding it out of operating member engaging position when so engaged by said catch member.

18. The apparatus of claim 9 wherein said means for moving said latch comprises a rotatable operating member having a latch engaging arm extending therefrom, means for turning said operating member to a selected initial position where said arm is out of engagement with said latch, and means for rotating said operating member from said initial position in successive increments, each of which is equivalent to one said cycle of movement of said mold means, until said arm is in said engagement with said latch.

19. The apparatus of claim 18 wherein there are provided a stop member operatively engaged by said operating member when in said initial position, urging means urging said operating member toward said stop member, means for varying the location of said stop member, a retaining member for retaining said operating member against movement after each said increment, and means for releasing said retaining member subsequent to the last of said increments for return of said operating member to said engagement of said stop member under the urging of said urging means.

20. The apparatus of claim 19 wherein said catch member is movable and said means for releasing comprises a release member carried by said pusher means and engaging said catch member on said movement of the pusher means from said first position toward said second position to move the catch member out of engagement with said operating member.

21. The apparatus of claim 20 wherein said means for varying the location of said stop member comprises a rotatable control member carrying a deactivating member movable with said control member and engageable with said catch member at a preselected position to retain said catch member out of engagement with said operating member.

References Cited

UNITED STATES PATENTS

| | | | |
|---|---|---|---|
| 2,299,314 | 10/1942 | Elesh et al. | 17—32 |
| 3,137,029 | 6/1964 | De Zolt | 17—32 |
| 3,222,935 | 12/1965 | Fetzer | 74—3.52 |
| 3,293,688 | 12/1966 | Holly | 17—32 |

LUCIE H. LAUDENSLAGER, Primary Examiner

U.S. Cl. X.R.

74—3.52